(12) United States Patent
Sonu

(10) Patent No.: US 6,426,926 B1
(45) Date of Patent: Jul. 30, 2002

(54) APPARATUS AND METHOD FOR ASYMMETRY CONTROL

(75) Inventor: Gene Sonu, San Jose, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 88 days.

(21) Appl. No.: 09/650,455

(22) Filed: Aug. 29, 2000

(51) Int. Cl.[7] .................................................. G11B 5/09

(52) U.S. Cl. .............................. 369/47.17; 369/53.33; 369/59.22; 369/124.05

(58) Field of Search .......................... 369/47.15, 47.17, 369/47.18, 47.35, 53.12, 53.31, 53.33, 53.34, 53.42, 53.44, 59.17, 59.18, 59.21, 59.22, 124.05, 124.15

(56) References Cited

U.S. PATENT DOCUMENTS 5,986,990 A * 11/1999 Moon ....................... 369/59.16
6,091,687 A * 7/2000 Verboom et al. ......... 369/59.17
6,324,135 B1 * 11/2001 Kim et al. ................ 369/47.17

* cited by examiner

*Primary Examiner*—Paul W. Huber
(74) *Attorney, Agent, or Firm*—Pennie & Edmonds LLP

(57) ABSTRACT

Apparatus and method for detecting zero-crossings and correcting asymmetry of an RF signal. The RF signal is first converted into a digital signal having a plurality of samples. Zero-crossings detection is achieved by calculating the differences between neighboring samples, and by determining whether the differences exceed a pre-determined threshold value. Zero-crossings are also detected by comparing the differences to a pre-determined negative threshold value when the differences are negative. If a zero-crossing sample, a sum of the data values of the neighboring samples is used to generate an asymmetry offset value.

14 Claims, 8 Drawing Sheets

APPARATUS AND METHOD FOR ASYMMETRY CONTROL

FIELD OF THE INVENTION

The present invention pertains generally to the technical field of digital signal processing. More particularly, the present invention pertains to an apparatus and method for asymmetry control in an optical PRML (Partial Response Maximum Likelihood) read channel.

BACKGROUND OF THE INVENTION

DVD, an acronym for digital video disc or digital versatile disc, is a relatively new type of compact-disc read-only-memory (CD-ROM) with a minimum capacity of approximately 4.7 gigabytes. A typical DVD player includes an optical pick-up unit (OPU), a read channel, and a digital video decoder. The OPU converts information read from the DVD into an analog RF signal. The read channel takes this RF signal and generates a digital data signal and a synchronous clock signal. The read channel couples these signals to the digital video decoder, which decodes the data and converts it into a video format compatible with a TV.

Due to imperfections in the manufacturing and recording processes, DVDs typically contain pits and/or marks with slightly incorrect lengths. The incorrect lengths of pits and/or marks, also known as domain bloom, may contribute to asymmetry in the RF signal. The presence of DC blocking capacitors introduces low frequence disturbances into the RF signal, and further exacerbates the asymmetry problem. If uncompensated, asymmetrical elements of the RF signal can be a major impairment to reliable data detection. Therefore, it is important for a DVD player to have the capability to accurately detect and compensate for such asymmetry.

In some conventional read channels, signal asymmetry is detected by using three digital samples along a signal edge (either positive edge or negative). The amplitude of the center sample is compared against a set threshold to see whether it represents a zero-crossing. If so, the two neighboring samples are then summed to determine the amplitude and polarity of the asymmetry. One problem, however, with this conventional approach is that a sample may be inaccurately identified as a zero-crossing if the amount of low frequency disturbance is significant. As a result, the performance of the read channel is adversely impacted.

Therefore, what is needed is an improved asymmetry control apparatus and method that is not sensitive to the amount of low frequency disturbance in the signal. What is also needed is an apparatus and method for detecting zero-crossings of a signal without comparing the center sample against a set threshold.

SUMMARY OF THE DISCLOSURE

Accordingly, the present invention provides an improved method and apparatus for detecting zero-crossings of a signal. Significantly, according to the present invention, a zero-crossing of a signal is detected by calculating the differences between neighboring samples, and by comparing the differences against pre-determined threshold value(s). Since the present invention does not directly compare signal samples against pre-determined thresholds, the present invention is independent of low frequency disturbances, baseline wandering and DC offset of the signal.

In one embodiment, the method of the present invention includes the step of receiving digital samples of an RF signal that has a first data value (d0), a second data value (d1) and a third data value (d2), and the step of calculating the differences between neighboring samples. Particularly, a first difference (d1−d0) is calculated by subtracting the first data value from the second data value; and, a second difference (d2−d0) is calculated by subtracting the second data value from the third data value. The first and second differences are then compared against a pre-determined threshold value. If both differences exceed the pre-determined threshold value, then it can be concluded that the center sample (d1) is a zero-crossing sample. An asymmetry offset value based on the first data value and the third data value can then be determined.

In another embodiment of the present invention, zero-crossing samples may be identified by comparing the differences to a pre-determined negative threshold value when the samples represent a negative edge. In that case, if both the first and second differences are smaller than the pre-determined negative threshold value, then it can also be concluded that the center sample is a zero-crossing sample.

The present invention also provides a zero-crossing circuit which may be implemented as part of an optical PRML read channel. In this embodiment, the optical PRML read channel includes an analog-to-digital converter for converting an RF signal into a digital signal, and an asymmetry control circuit for correcting asymmetry of the digital signal. The asymmetry control circuit of the present embodiment includes circuits for receiving samples of the digital signal, circuits for identifying a zero-crossing sample by calculating differences between neighboring samples and comparing the differences to pre-determined threshold value(s), and circuits for generating an asymmetry offset voltage based on the values of the digital samples, provided a zero-crossing sample is detected.

BRIEF DESCRIPTION OF THE DRAWINGS

Additional features of the invention will be more readily apparent from the following detailed description and appended claims when taken in conjunction with the drawings, in which:

DETAILED DESCRIPTION OF THE PREFERRED EMBODIMENTS

Figure 1:
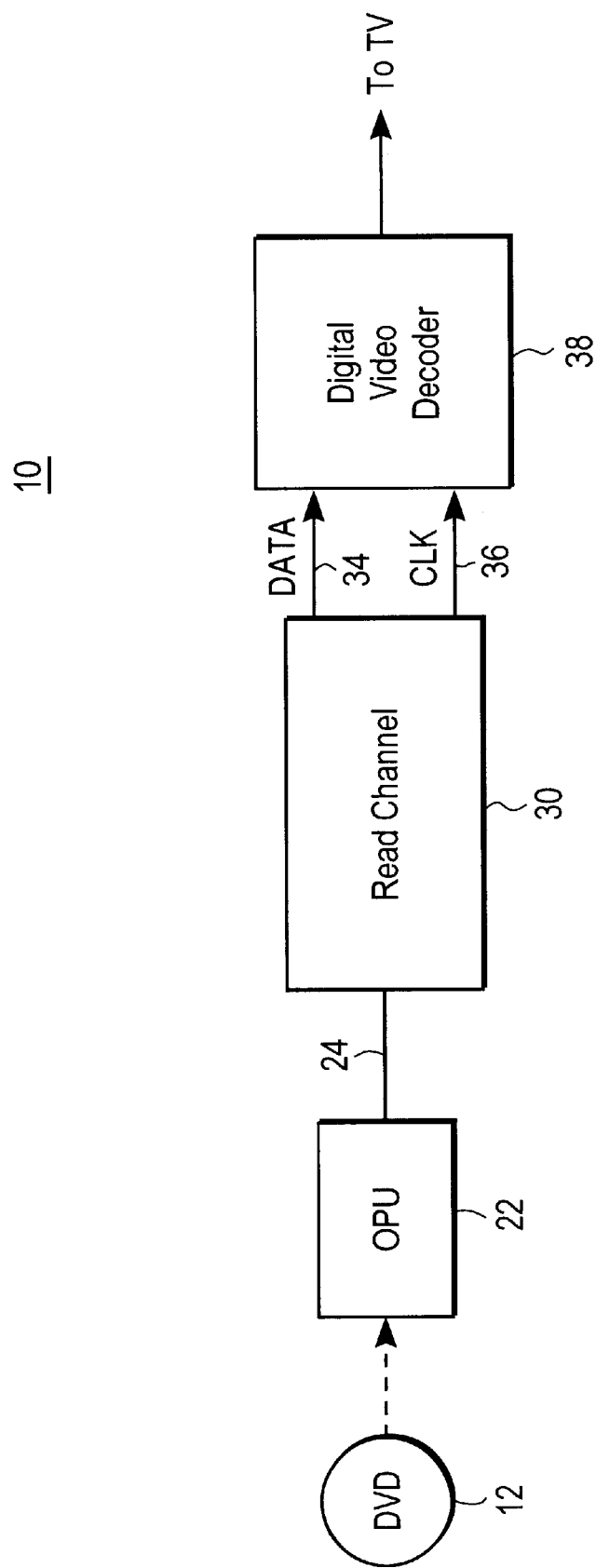
FIG. 1 illustrates, in block diagram form, a DVD player in which embodiments of the present invention may be implemented.

FIG. 1 illustrates, in block diagram form, a DVD player 10 in which embodiments of the present invention may be implemented. As illustrated, DVD player 10 includes an optical pick-up unit (OPU) 22, a read channel 30 and a digital video decoder 38. OPU 22 reads data from a DVD 12 and generates an RF signal. AGC circuitry of the read channel 30 takes the RF signal from OPU 22 on line 24 and generates a digital data signal on line 34. Clock generator circuitry of the read channel 30 generates a clock signal on line 36. Using the data signal and clock signal, digital video decoder 38 then decodes the digital data signal to produce a video signal in a format compatible with TV.

Figure 2:
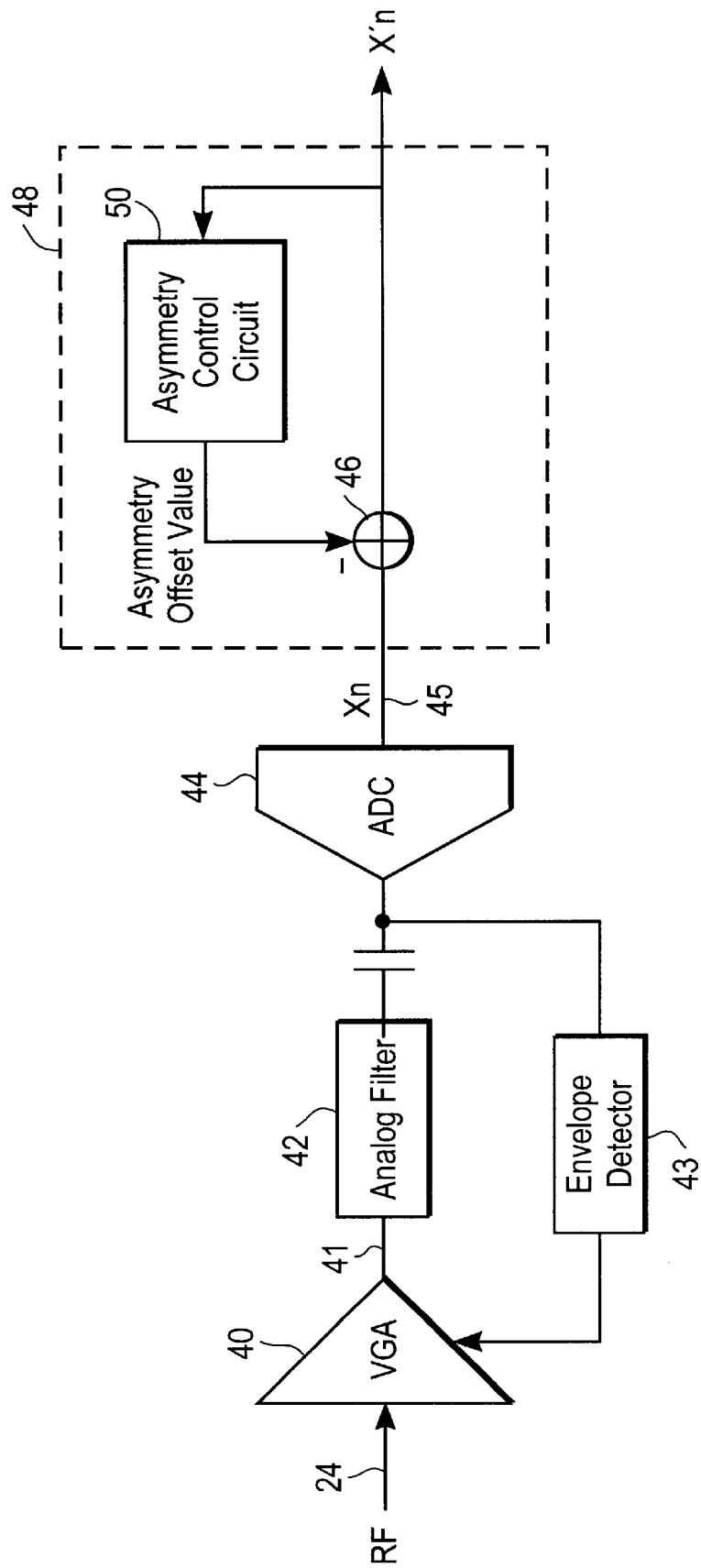
FIG. 2 is a block diagram illustrating portions of read channel of FIG. 1 in which embodiments of the present invention may be implemented.

FIG. 2 illustrates, in block diagram form, portions of read channel 30 of FIG. 1. As shown, read channel 30 includes a voltage controlled gain amplifier (VGA) 40, an analog filter 42, an analog-to-digital converter (ADC) 44, and an asymmetry control loop 48 that includes feedback logic 46 and an asymmetry control circuit 50. Read channel 30 also includes well known components, such as a viterbi decoder, a digital gain control block, a digital-to-analog converter (DAC), etc., which are not illustrated in FIG. 2.

Figure 6:
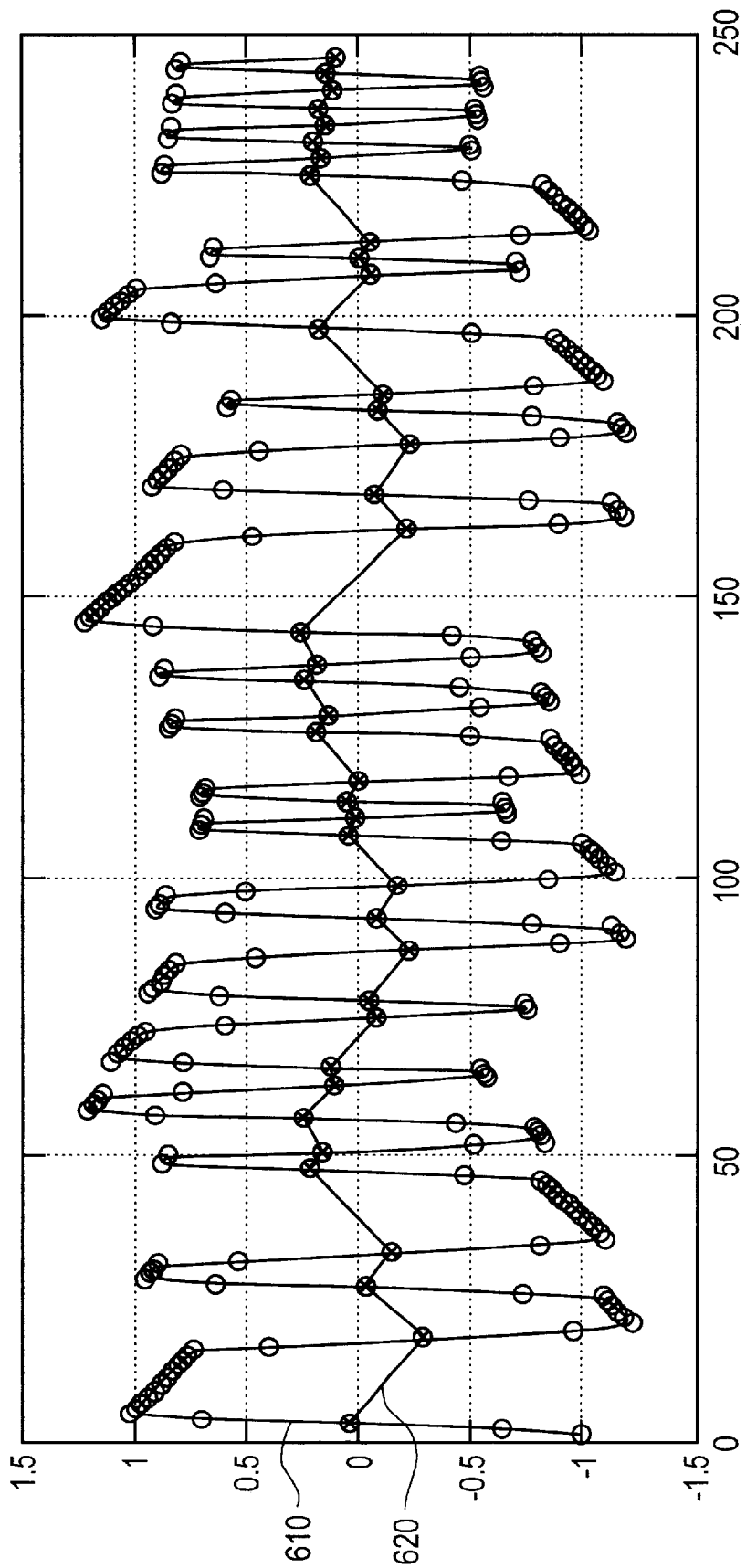
FIG. 6 illustrates an exemplary asymmetrical waveform before an asymmetry control process of the present invention is applied.

In operation, VGA amplifier 40 amplifies RF input signal on line 24. The amplified RF signal on line 41 is then provided to analog filter 42. The filtered and amplified RF signal output by analog filter 42 is capacitively coupled to ADC 44. The gain of the VGA amplifier 40 is controlled by the output of envelope detector 43. ADC 44 converts the analog RF signal into a digital data signal, $X_n$, on line 45. The $X_n$ signal may be a 5-bit or 6-bit wide signal. Due to domain bloom and low frequency disturbances caused by DC blocking capacitors of read channel 30, the digital data signal $x_n$ is asymmetrical. FIG. 6 illustrates an exemplary asymmetrical waveform 610 that is generated by ADC 44. Also illustrated is a line 620 connecting the zero-crossing samples of the waveform 610.

The asymmetry present within the output waveform of ADC 44 is undesirable because it may significantly impair the performance of read channel 30. Therefore, the present invention provides an asymmetry control loop 48 that detects and removes asymmetry from the digital data signal $x_n$ to produce a corrected signal $x'_n$. The $x'_n$ signal is then processed by other circuitry (e.g., viterbi decoder) of read channel 30 to produce the output video/audio signals.

Figure 7:
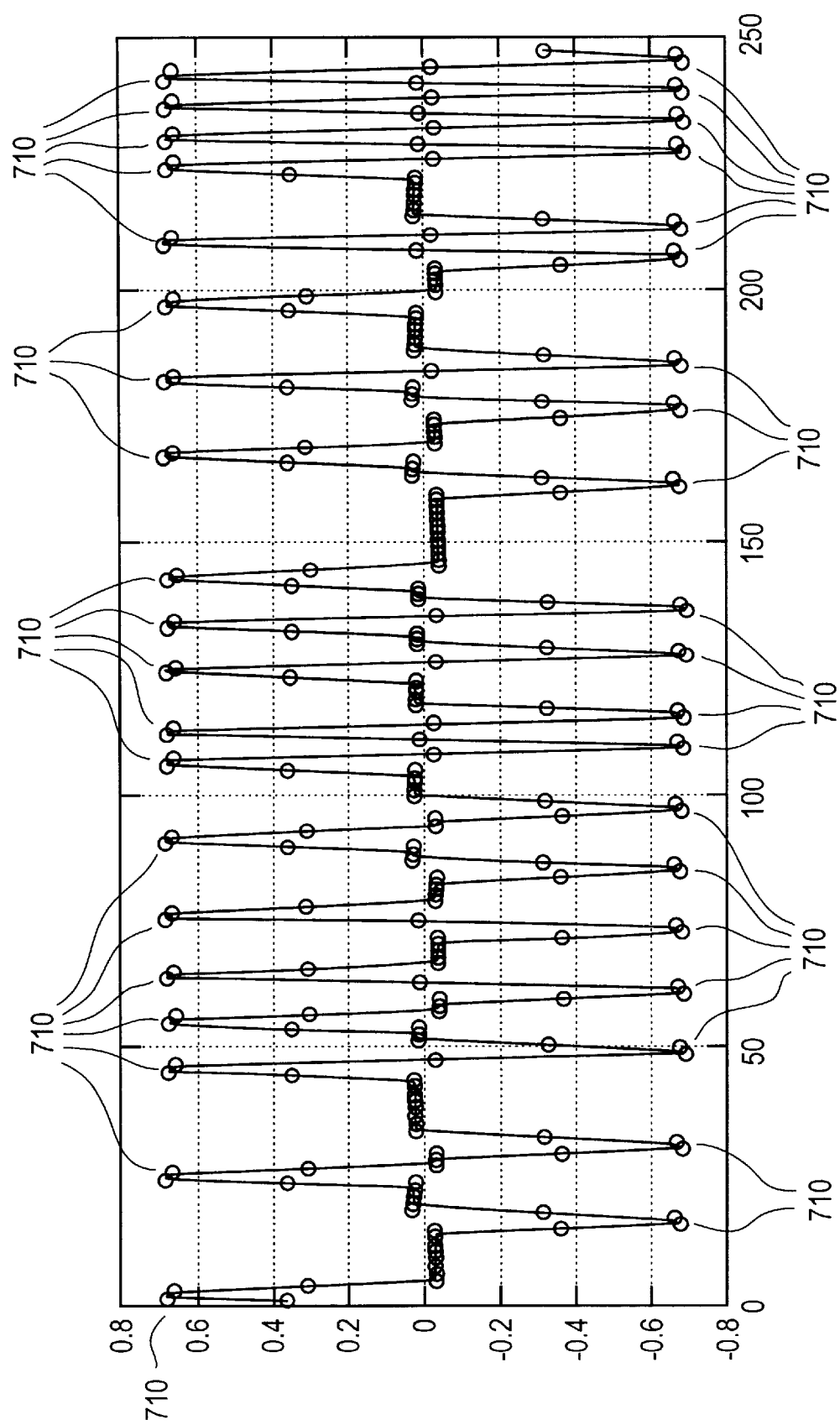
FIG. 7 illustrates a waveform generated by calculating the differences of neighboring samples of waveform of FIG. 6 according to one embodiment of the present invention.

Asymmetry control is achieved by generating an asymmetry offset value, and applying the asymmetry offset value to the digital data signal $x_n$ to produce the corrected signal $x'_n$. Generation of the asymmetry offset value is accomplished by first identifying the zero-crossing samples (e.g., samples that lie on the baseline), and determining the baseline offset values of the zero-crossing samples. The baseline offset values are then provided to an accumulator circuit which averages the baseline offset values over time to generate the asymmetry offset value. In contrast to conventional asymmetry correction methodologies, asymmetry control circuit 50 calculates the differences between neighboring samples. Asymmetry control circuit 50 then uses the differences to identify "zero-crossing" or "baseline-crossing" samples by comparing the differences to predetermined threshold values. For instance, FIG. 7 illustrates the differences between neighboring samples of waveform 610. Also illustrated in FIG. 7 are peaks 710, each representing a zero-crossing sample of waveform 610. Once a "zero-crossing" sample is identified, the corresponding baseline offset value can be approximated by summing the values of its neighboring samples.

Figure 8:
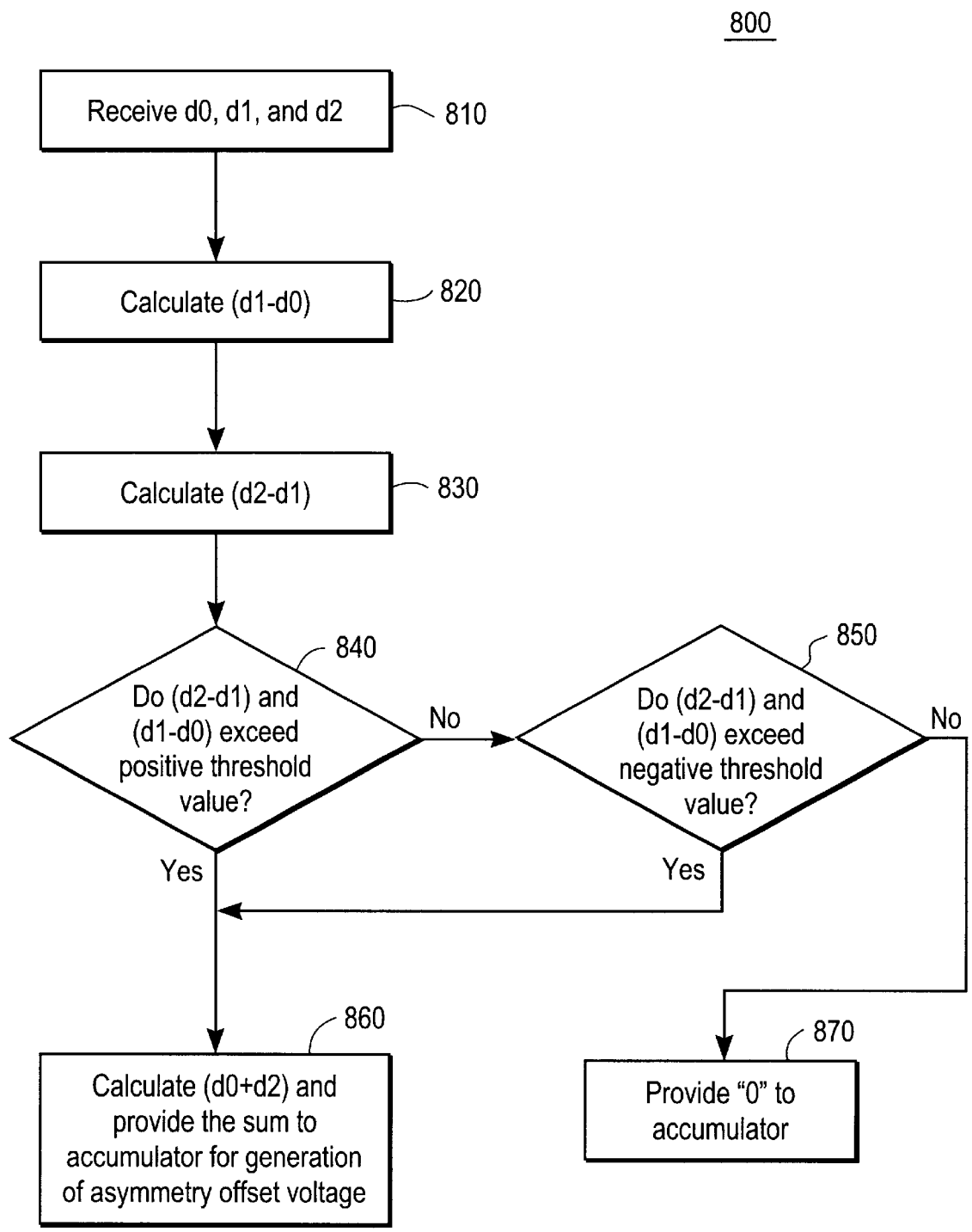
FIG. 8 is a flow diagram illustrating the operations of an asymmetry control apparatus in accordance with an embodiment of the present invention.

FIG. 8 is a flow diagram 800 illustrating operation steps of asymmetry control circuit 50 in accordance with one embodiment of the present invention. As illustrated, at step 810, three samples, d0, d1 and d2, of an input signal are received. For clarity, in the present discussion, it is assumed that d1 is the center sample, and that d0 and d2 are samples neighboring d1.

At step 820, a first difference between d1 and d0 is determined; and, at step 830, a second difference between d2 and d1 is determined.

At step 840, it is determined whether the first difference and the second difference exceed a positive threshold value. In the present embodiment, the positive threshold value is set such that, if d0, d1 and d2 defines a positive signal edge (e.g., a rising edge), the first difference and the second difference will exceed the positive threshold value. On the contrary, if do, d1 and d2 do not define a positive signal edge, the first difference and the second difference will not exceed the positive the threshold value.

At step 850, it is determined whether the first difference and the second difference are smaller than a negative threshold value. In the present embodiment, the negative threshold value is set such that, if d0, d1 and d2 defines a negative signal edge (e.g., a falling edge), the first difference and the second difference will be smaller than the negative threshold value. On the contrary, if d0, d1 and d2 do not define a negative signal edge, the first difference and the second difference will be larger than the negative the threshold value.

At step 860, if it is determined that the samples d0, d1 and d2 define either a positive signal edge or a negative signal edge, the values of d0 and d2 are summed. The sum (d0+d2), theoretically, would equal $2\Delta$, where $\Delta$ is the baseline offset of the zero-crossing sample. The sum (d0+d2) is then provided to an accumulator circuit (e.g., circuit 324 shown below in FIG. 3).

At step 870, if it is determined that the samples d0, d1 and d2 do not define a signal edge, a value of "0" is provided to the an accumulator circuit.

Thereafter, steps 810 to 870 are repeated for a next sample of input data.

Figure 3:
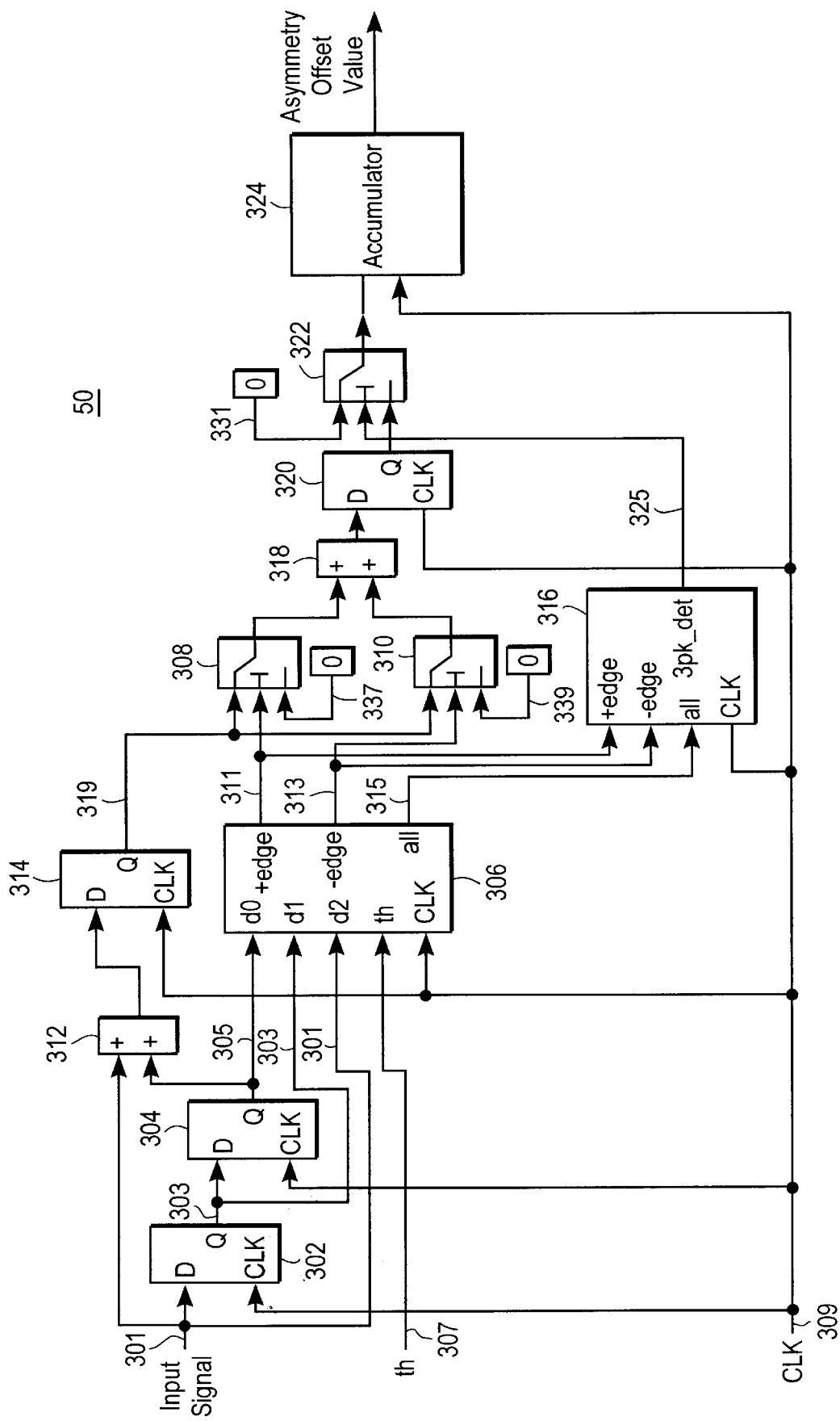
FIG. 3 is a block diagram illustrating an asymmetry control circuit that implements an asymmetry control process in accordance with one embodiment of the present invention.

FIG. 3 is a block diagram illustrating an implementation of asymmetry control circuit 50 in accordance with one embodiment of the present invention. As illustrated in FIG. 3, asymmetry control circuit 50 includes memory elements (e.g., flip-flops) 302, 304 configured for latching in an input signal via input line 301 synchronously with clock signal CLK on line 309. The outputs of memory elements 302, 304 are coupled to peak detection circuit 306 via lines 303 and 305, respectively. Peak detection circuit 306, in addition to receiving samples of the input signal from the memory elements 302, 304, receives signal samples via line 301. In essence, peak detection circuit 306 receives three samples of the input signal. For simplicity, the sample that is latched by memory element 304 is denoted as d0. The sample that is latched by memory element 302 is denoted as d1. And, the sample that is provided on input line 301 is denoted as d2. In the present description, d1 is also known as the center sample. Peak detection circuit 306 is also coupled to receive a threshold value, th, via line 307, and a clock signal CLK via line 309.

Also illustrated in FIG. 3 are adder 312 and another memory element 314. Inputs of adder 312 are coupled to receive d2 and d0 via lines 301 and 305, respectively. The output of adder 312 is coupled to provide the sum of the two samples (d2+d0) to memory element 314. The output of the memory element 314 is coupled to inputs of muxes 308, 310 via line 319. Muxes 308, 310 further include input lines 337 and 339 that are coupled to receive a "0" value. Outputs of muxes 308, 310 are coupled to inputs of adder 318. The output of adder 318 is coupled to yet another memory element 320. Output of memory element 320 is coupled to yet another mux 322, the output of which is coupled to accumulator 324.

According to the present embodiment, peak detection circuit 306 processes d0, d1, d2, th, and CLK, and produces three outputs "+edge", "−edge" and "all". The "+edge" signal is provided to the select input of mux 308 via line 311, and the "−edge" signal is provided to the select input of mux 310 via line 313. In operation, when the "+edge" signal is asserted, mux 308 selects line 319 as its input. When the "+edge" signal is unasserted, mux 308 selects line 337 as its input. When the "−edge" signal is asserted, mux 310 selects line 319 as its input. When "−edge" signal is unasserted, mux 319 selects line 339 as its input. As a result, when peak detection circuit 306 indicates that either a "+edge" or a "−edge" signal is detected, the value of (d2+d0) is provided to memory element 320. When "+edge" and "−edge" signals are not detected, the value of 0 is provided to memory element 320.

In the present embodiment, accumulator 324 may be implemented by well known loop filter with programmable loop gain, and is therefore not described herein in detail to avoid obscuring aspects of the present invention.

Outputs of peak detection circuit 306 are also coupled to a three peak-samples detection circuit 316. Three peak-samples detection circuit 316 determines whether three-sample peaks are present. The presence of three-sample peaks may indicate that the clock is jittering in a very noisy condition. The resulting asymmetry correction can become very inaccurate. Thus, according to the present invention, if three-sample peaks are detected, the asymmetry control process is temporarily suspended. In the illustrated embodiment, when a three-sample peak is detected, a "3pk_det" signal is asserted and is provided to the select input of mux 322 via line 325. As a result, the value (d2+d0) are not passed onto accumulator 324, even though "+edge" or "−edge" may be asserted.

Figure 4:
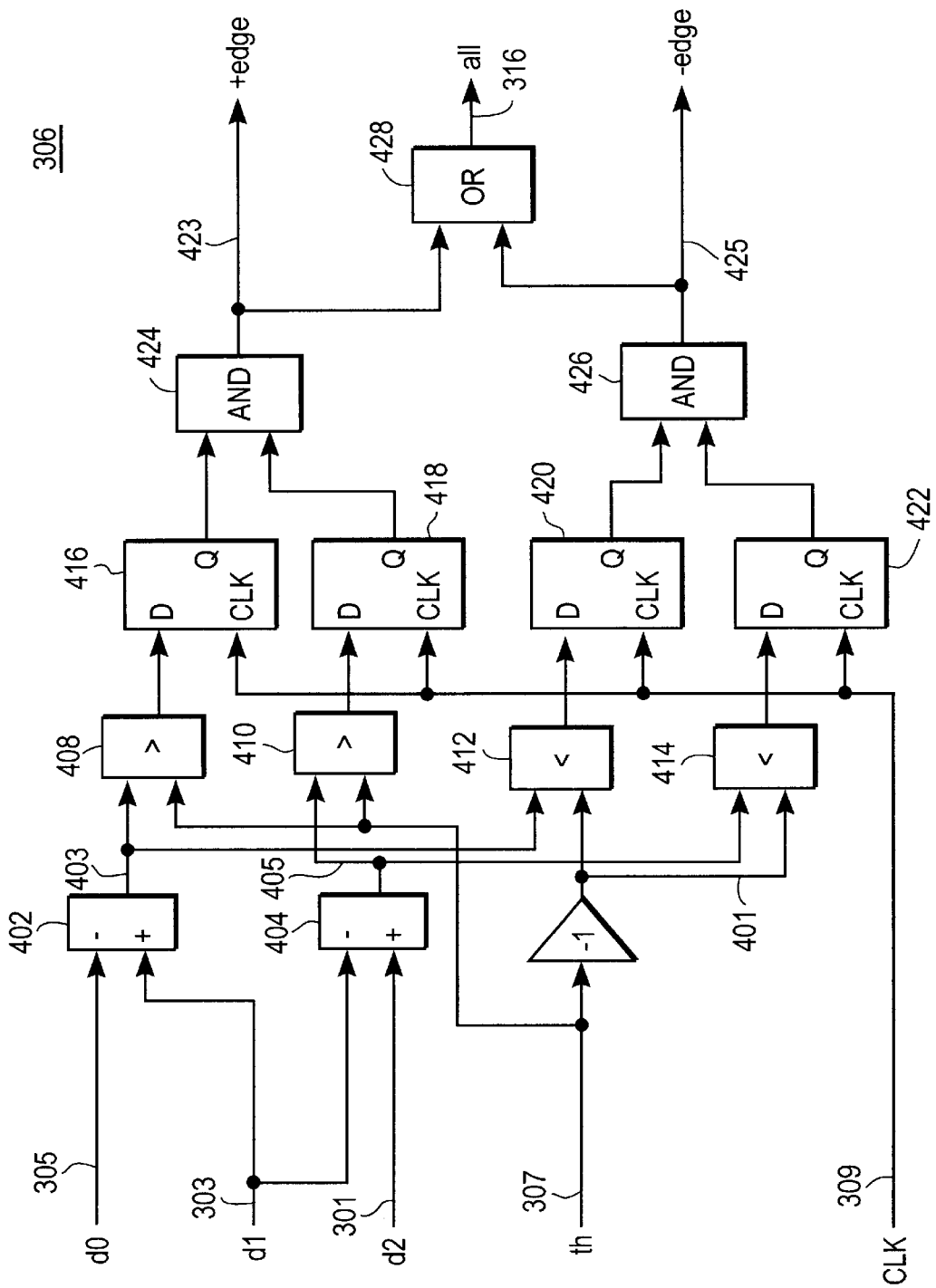
FIG. 4 is a block diagram illustrating one implementation of a peak detection circuit in accordance with one embodiment of the present invention.

FIG. 4 is a block diagram illustrating one implementation of peak detection circuit 306 in accordance with one embodiment of the present invention. As illustrated in FIG. 4, a subtraction circuit 402 is coupled to receive d0 and d1 via lines 305 and 303, respectively, to produce an output (d1−d0) on line 403. Another subtraction circuit 404 is coupled to receive d1 and d2 via lines 303 and 301, respectively, to produce an output (d2−d1) on line 405. Also illustrated in FIG. 4 are comparators 408, 410, 412 and 414. Inputs of comparator 408 are coupled to line 403 and line 307 to receive (d1−d0) and the threshold value th. Inputs of comparator 410 are coupled to line 405 and line 307 to receive (d2−d1) and the threshold value th. In the embodiment as illustrated, output of comparator 408 will be asserted when the difference (d1−d0) exceeds the threshold value th. Further, output of comparator 410 will be asserted if the difference (d2−d1) exceeds the threshold value th. Outputs of comparators 408 and 410 are coupled to line 423 via memory elements 416 and 418 and "AND" gate 424. As a result, the "+edge" signal will be asserted if (d1−d0) and (d2−d1) both exceed the threshold value th.

For a negative edge (e.g., a falling edge), the values of (d1−d0) and (d2−d1) may be negative. Thus, in order to detect the zero-crossing of a falling edge, values of (d1−d0) and (d2−d1) are also provided to comparators 412 and 414, which compare (d1−d0) and (d2−d1) against a negative threshold value, −th. Outputs of comparators 412 and 414 are coupled to line 425 via memory elements 420 and 422 and "AND" gate 426. As a result, the "−edge" signal will be asserted if (d1−d0) and (d2−d1) are smaller than the negative threshold value −th. In addition, the "+edge" signal and "−edge" signal are coupled to inputs of an "OR" gate 428, which produces an "all" signal on line 315.

Figure 5:
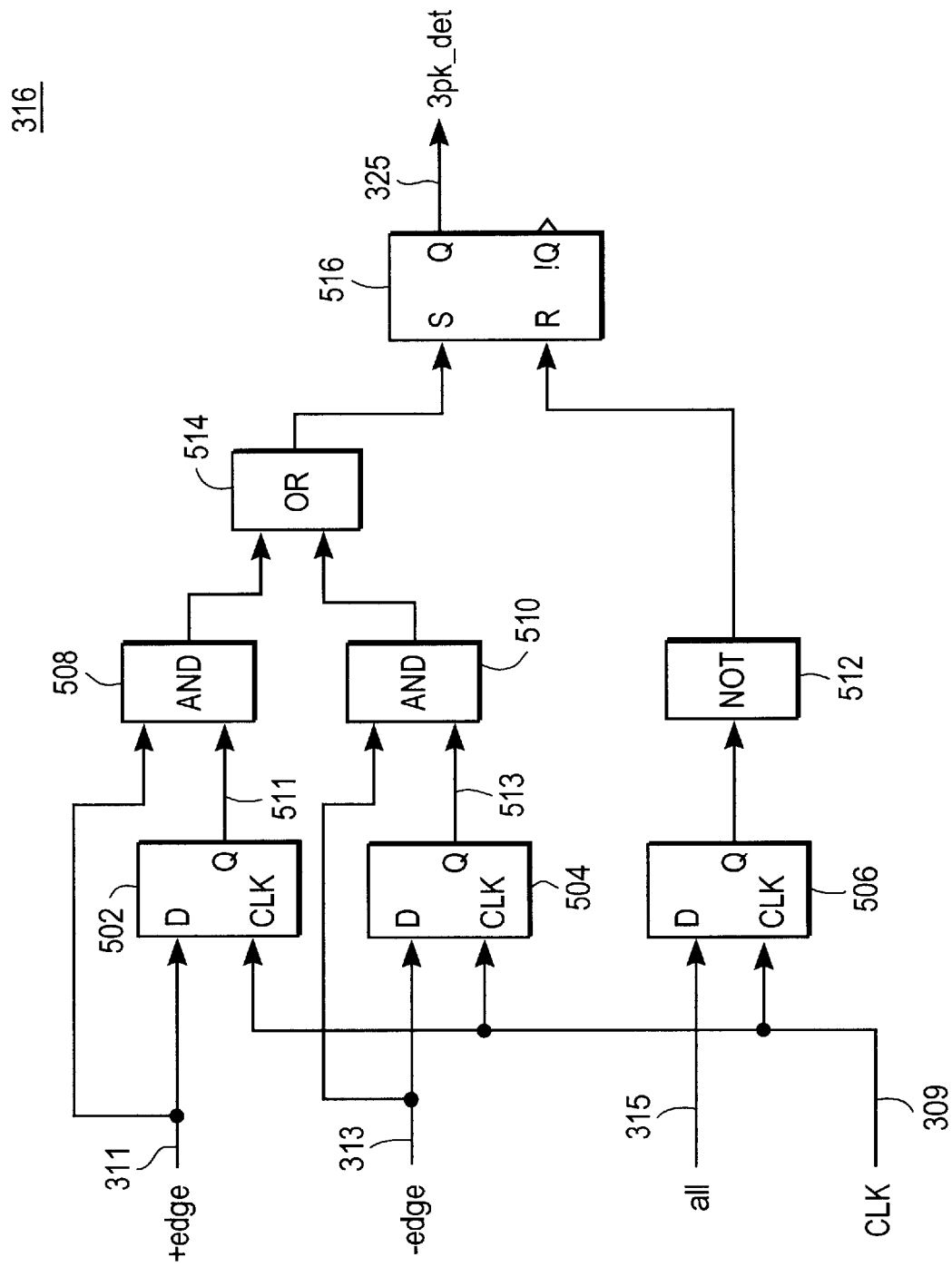
FIG. 5 is a block diagram illustrating one implementation of a 3-samples peak detection circuit in accordance with one embodiment of the present invention.

FIG. 5 is a block diagram illustrating one implementation of three-sample peak detection circuit 316 in accordance with one embodiment of the present invention. As illustrated in FIG. 5, the "+edge" signal and "−edge" signal are received and latched by memory elements 502 and 504, respectively. The outputs of memory elements 502 and 504 are provided to "AND" gates 508 and 510. Inputs of "AND" gates 508, 510 are also copled to lines 311, 313 to receive "+edge" and "−edge" signals. Thus, output of "AND" gate 508 will be asserted when two consecutive "+edge" signals are received. Output of "AND" gate 510 will be asserted when two consecutive "−edge" signals are received. Outputs of "AND" gates 508 and 510 are provided to "OR" gate 514, whose output is coupled to the set input of an SR-latch 516. Thus, when two consecutive "+edge" signals or two consecutive "−edge" signals are received, SR-latch 516 will be set, asserting the 3pk_det signal on line 325. Also illustrated is another memory element 506 which receives and latches the "all" signal via line 315. Output of the memory element 506 is provided to the input of an inverter 512, which inverts the "all" signal. The output of the inverter 512 is coupled to the reset input of the SR-latch 516.

The present invention, an improved apparatus and method for asymmetry control, has thus been described. While the present invention has been described with reference to a few specific embodiments, the description is illustrative of the invention and is not to be construed as limiting the invention. Particularly, although the present invention has been described with specific references to DVD technology, the scope of the present invention should not be construed to be limited as such. Rather, various modifications may occur to those skilled in the art without departing from the true spirit and scope of the invention as defined by the appended claims.

What is claimed is:

1. Electronic circuitry for detecting zero-crossings of an RF signal, comprising:
   first logic circuits for receiving digital samples of said signal, said digital samples including a first data value, a second data value and a third data value;
   second logic circuits for calculating a first difference between said second data value and said first data value, said second logic circuits further for calculating a second difference between said third data value and said second data value; and
   third logic circuits for determining whether said first difference and said second difference exceed a predetermined positive threshold value.

2. The electronic circuitry of claim 1, wherein said first logic circuits comprise:
   a first memory element for storing said first data value; and
   a second memory element for storing said second data value.

3. The electronic circuitry of claim 1, wherein said second logic circuits comprise:
   a first subtractor circuit for determining said first difference; and a second subtractor circuit for determining said second difference.

4. The electronic circuitry of claim 3, wherein said third logic circuits comprise:
   a first comparator circuit for comparing said first difference to said pre-determined positive threshold value; and
   a second comparator circuit for comparing said second difference to said pre-determined positive threshold value.

5. The electronic circuitry of claim 1, further comprising fourth logic circuits for determining whether said first difference and said second difference are smaller than a pre-determined negative threshold value.

6. The electronic circuitry of claim 5, wherein said fourth logic circuits comprise:
   a third comparator circuit for comparing said first difference to said pre-determined negative threshold value; and
   a fourth comparator circuit for comparing said second difference to said pre-determined negative threshold value.

7. A method of detecting zero-crossings of an RF signal, comprising steps of:
   (a) sampling said RF signal to produce digital samples, said digital samples including a first data value, a second data value and a third data value;
   (b) calculating a first difference between said second data value and said first data value;
   (c) calculating a second difference between said third data value and said second data value;
   (d) determining whether said first difference and said second difference exceed a pre-determined positive threshold.

8. The method of claim 7, further comprising step of:
   (e) determining whether said first difference and said second difference are smaller than a pre-determined negative threshold value.

9. A method of correcting asymmetry in an RF signal, comprising steps of:
   sampling said RF signal to produce digital samples, said digital samples including a first data value, a second data value and a third data value;
   calculating a first difference between said second data value and said first data value;
   calculating a second difference between said third data value and said second data value;
   determining a sum of said first data value and said third data value;
   determining whether said first difference and said second difference exceed a pre-determined positive threshold value; and
   provided said first difference and said second difference exceed said pre-determined positive threshold value, generating an asymmetry offset value based on said sum.

10. The method of claim 9, further comprising steps of:
    determining whether said first difference and said second difference are smaller than a predetermined negative threshold value; and
    provided said first difference and said second difference are smaller than said pre-determined negative threshold value, generating an asymmetry offset value based on said sum.

11. An optical PRML (Partial Response Maximum Likelihood) read channel, comprising:
    (a) an analog-to-digital converter for converting an RF signal into a digital signal, said digital signal comprising a first data value, a second data value and a third data value; and
    (b) an asymmetry control feedback loop coupled to receive said digital samples from said analog-to-digital converter, said asymmetry control feedback loop comprising an asymmetry control circuit, said asymmetry control circuit including:
       (i) first circuits for receiving said digital samples,
       (ii) second circuits for calculating a first difference between said second data value and said first data value, said second circuits further for calculating a second difference between said third data value and said second data value;
       (iii) third circuits for comparing said first and second differences to a pre-determined threshold value, and
       (iv) fourth circuits for generating an asymmetry offset value to be removed from said digital signal, wherein said asymmetry offset value is based on said first data value and said third data value.

12. The optical PRML read channel of claim 11, wherein said second circuits further comprise:
    a first subtractor circuit for determining said first difference; and
    a second subtractor circuit for determining said second difference.

13. The optical PRML read channel of claim 11, wherein said third circuits comprise:
    a first comparator circuit that compares said first difference to said pre-determined threshold value; and
    a second comparator circuit that compares said second difference to said predetermined threshold value.

14. The optical PRML read channel of claim 11, wherein said fourth circuits comprise:
    an adder circuit for adding said first data value to said third data value to produce a sum; and
    an accumulator circuit for generating said asymmetry offset voltage based on said sum.

* * * * *